(12) United States Patent
Pulliam

(10) Patent No.: US 8,327,771 B2
(45) Date of Patent: Dec. 11, 2012

(54) DRIVE ON/DRIVE OFF LAND TRUCK FERRY

(75) Inventor: Robert C. Pulliam, Houston, TX (US)

(73) Assignee: Tubular Rail, Inc., Houston, TX (US)

( * ) Notice: Subject to any disclaimer, the term of this patent is extended or adjusted under 35 U.S.C. 154(b) by 439 days.

(21) Appl. No.: 12/531,734

(22) PCT Filed: Mar. 19, 2008

(86) PCT No.: PCT/US2008/057446
§ 371 (c)(1),
(2), (4) Date: Sep. 17, 2009

(87) PCT Pub. No.: WO2008/115962
PCT Pub. Date: Sep. 25, 2008

(65) Prior Publication Data
US 2010/0107920 A1    May 6, 2010

Related U.S. Application Data

(60) Provisional application No. 60/895,499, filed on Mar. 19, 2007.

(51) Int. Cl.
*B61B 12/00* (2006.01)
(52) U.S. Cl. ........................................ 104/307; 105/355
(58) Field of Classification Search ............. 104/130.01, 104/130.11, 307, 96, 99, 35, 41, 48, 49, 50; 105/215.1, 215.2, 72.2
See application file for complete search history.

(56) References Cited

U.S. PATENT DOCUMENTS

| | | | | |
|---|---|---|---|---|
| 3,797,401 A * | 3/1974 | Alimanestianu | ......... | 104/130.01 |
| 3,804,025 A * | 4/1974 | Elliott | ........................... | 105/72.2 |
| 4,425,064 A * | 1/1984 | Walda et al. | ...................... | 410/1 |
| 4,729,322 A * | 3/1988 | Harshberger | ................ | 104/245 |
| 5,377,910 A * | 1/1995 | Newton | ........................ | 238/121 |
| 6,352,035 B1 * | 3/2002 | Kashiwase et al. | .......... | 105/72.2 |
| 6,904,847 B2 * | 6/2005 | Bielka | ........................... | 104/307 |
| 6,976,432 B2 * | 12/2005 | Jacob | ........................... | 105/72.2 |
| 7,789,020 B2 * | 9/2010 | Li | ............................. | 104/130.01 |
| 7,891,303 B2 * | 2/2011 | Dupont et al. | ............. | 105/215.1 |
| 7,975,617 B2 * | 7/2011 | Li | ............................. | 104/130.01 |
| 7,975,618 B2 * | 7/2011 | Bullis | .......................... | 105/72.2 |
| 2001/0050026 A1 * | 12/2001 | Esposito et al. | ........... | 105/215.2 |
| 2007/0089637 A1 * | 4/2007 | Sproat | ......................... | 105/72.2 |
| 2007/0289477 A1 * | 12/2007 | Sobolewski | ............... | 105/215.2 |
| 2009/0050011 A1 * | 2/2009 | Li | ............................. | 104/130.01 |
| 2010/0107920 A1 * | 5/2010 | Pulliam | ........................ | 104/307 |

OTHER PUBLICATIONS

Written Opinion and International Search Report dated Aug. 21, 2008 for Appl. No. PCT/US2008/057446; (8 p.).

* cited by examiner

*Primary Examiner* — Jason C Smith
(74) *Attorney, Agent, or Firm* — Conley Rose, P.C.

(57) ABSTRACT

A transport system for trucks includes a body adapted to support the trucks. The body has a plurality of rollers and at least a parallel set of rails. A pair of side rails is disposed on the ground for engagement with the rollers. A parallel set of supports are also disposed on the ground with each support having a wheel engaging the rails.

13 Claims, 5 Drawing Sheets

DRIVE ON/DRIVE OFF LAND TRUCK FERRY

BACKGROUND OF THE INVENTION

The present invention relates to apparatus and methods for transporting trucks long distances using railways.

In the late 1860's as the Union Pacific was pushing the transcontinental railroad westward toward the Rockies, the Great Plains were described as a "trackman's paradise". Flat and dry three miles a day of track could be laid with the technology of the day. Today these stretches of land are crisscrossed by modern interstates supporting a massive trucking fleet serving distant cities. As transportation operating costs continue to rise in a fossil fuel constrained world, rural empty land becomes the nemesis of both the railroads, and the long haul trucking operators.

The complexities and the problems of the American transportation system are as complex as the system is vast. These problems need to be solved by merging the best attributes of the trucking fleet with those of the railroads, the flexibility of the truck with the efficiency of the train. At first it was thought that purchase and rehabilitation of abandoned lines was the best route to take. Although doable, this method faces the most difficulties, particularly in terms of funding. Another option was to find an existing short line railroad and expand it using its powers of eminent domain when a public good can be demonstrated. This scenario was more viable but also had timing and financing drawbacks.

What then emerged was a plan to contract or franchise with existing major railroads to provide track and locomotive service. As long as they can maintain the set schedule, they would be free to use the new or upgraded lines. In this scenario everybody benefits. Railroads get a new source of revenue and the use of an upgraded track. The trucking companies benefit for obvious reasons. Environmental interests and fuel conservation groups also have a plan they can support. This enables coalition building on the political front.

Transportation is absolutely vital to all aspects of the national economy. Often times those with direct involvement in the industry work at loggerheads with each other and are in an adversarial relationship with clean air interests and the taxpayers that fund the highway construction. There is a need for a transportation system that interests can support.

There is a nationwide driver shortage estimated at 400,000 drivers at the current time. Given current unemployment rates and demographics, this shortage will not be alleviated in the near future. Add to this situation the fact that commercial drivers are regulated in a variety of ways, the most pertinent is that the number of hours they can drive is limited to 11 hours in a 14 hour period followed by a mandatory 10 hour break. When 70 on-duty hours are logged in an eight day period (or 60 in a seven day), the driver must also not drive until 34 continuous off duty hours are logged, his clock then resets. However logging sleeper time is not counted as on-duty or driving time thus allowing team operations.

A driver is typically paid on a per mile driven basis. Drivers with no experience often start at 30 cents per mile and senior drivers with unionized carriers can make as much as 50 cents. Add to this, 80 cents per mile for fuel, with fuel costs continually rising, and the minimal operating costs start at $1.10 per mile. This does not consider per mile depreciation, maintenance and insurance such that those drivers owning their own rigs need to average $1.50 to $2.00 per mile in revenue just to break even financially. (1$^{st}$ Q 2008)

SUMMARY OF THE INVENTION

A transport system for trucks includes a ferry adapted to support the trucks for movement over a railroad. The body has a plurality of rollers and at least a parallel set of rails. A pair of side rails is disposed on the ground for engagement with the rollers. A parallel set of supports is also disposed on the ground across existing roadways with each support having a wheel engaging the rails.

The present invention overcomes the deficiencies of the prior art. Other objects and advantages of the invention will appear from the following description.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of a preferred embodiment of the invention, reference will now be made to the accompanying drawings wherein.

DESCRIPTION OF PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
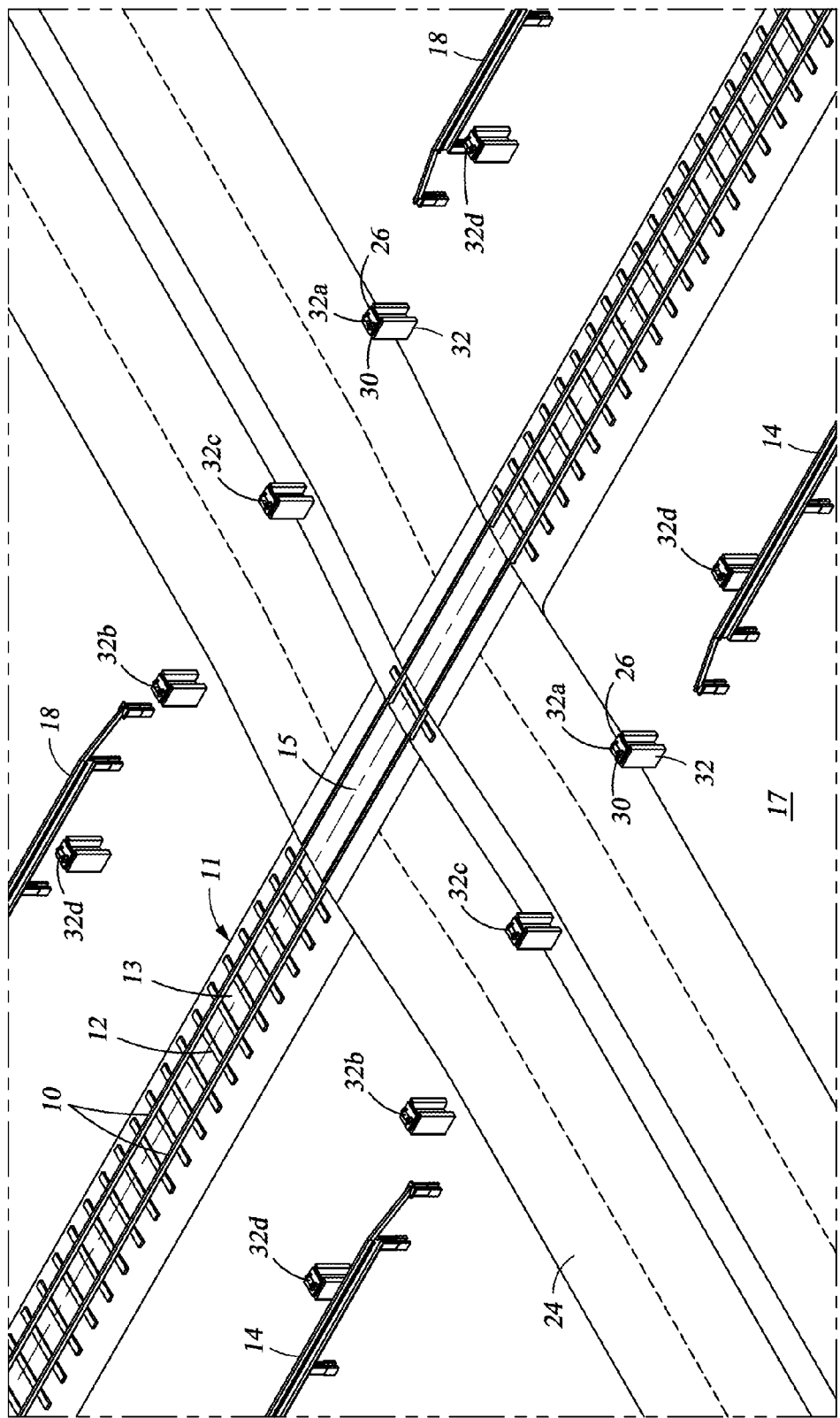
FIG. 1 is a perspective view of a railway track with side rails and wheels across an existing roadway.

Referring initially to FIG. 1, there is shown a standard railroad track 11 with rails 10, cross ties 12 and ballast 13. The apparatus of an embodiment adds two outrigger side rails 14, 18 extending parallel with the original rails 10 at a distance of approximately thirty feet from the original center line 15 of the railroad track 11. These side rails 14, 18 serve as a mechanism to balance a significantly widened rail flatcar, i.e., truck ferry 20, shown in FIGS. 2 and 3. Outrigger side rails 14, 18 are supported by mounts 72 disposed on the ground 17.

Figure 2:
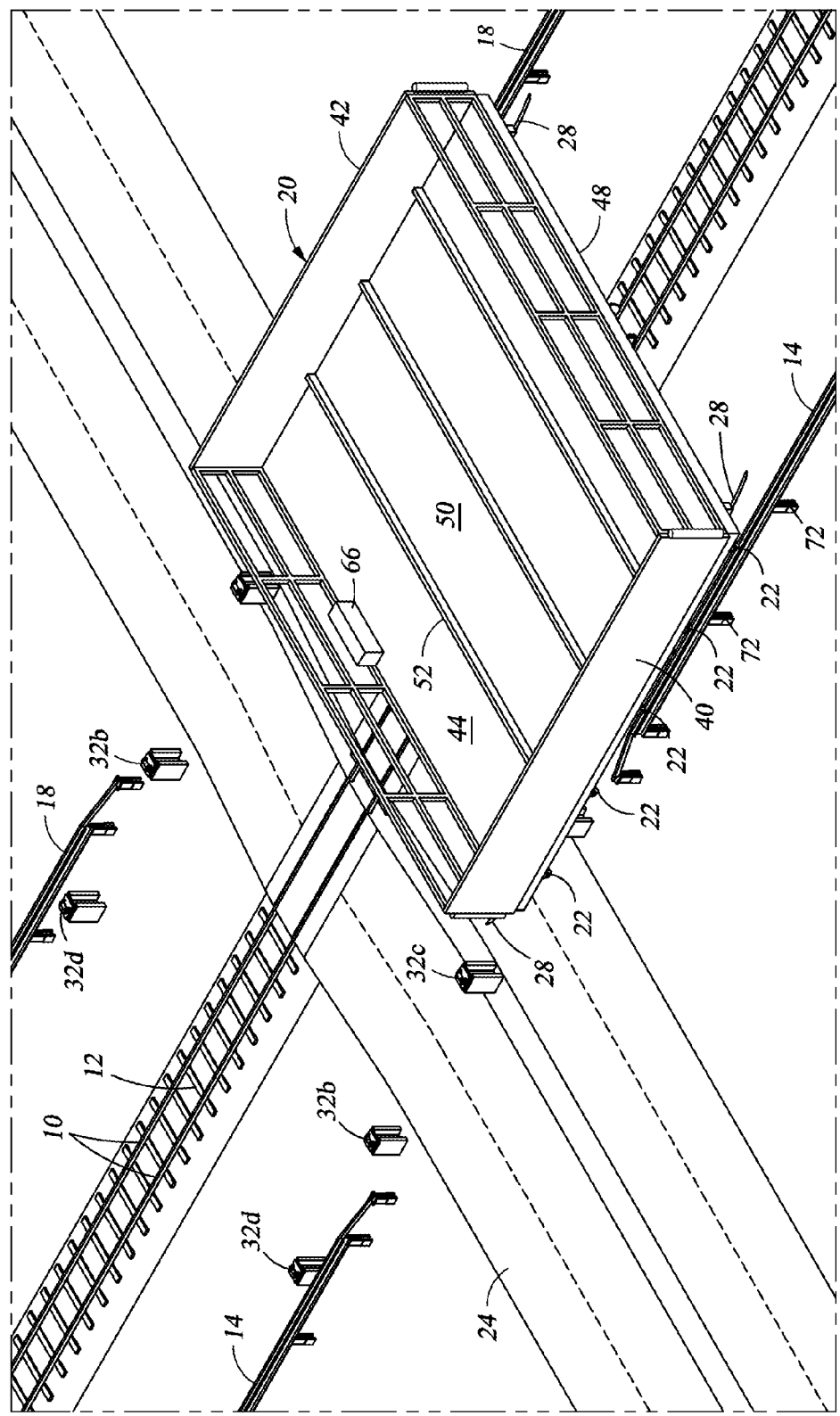
FIG. 2 is a perspective view of a truck ferry on the railway track of FIG. 1.
Figure 3:
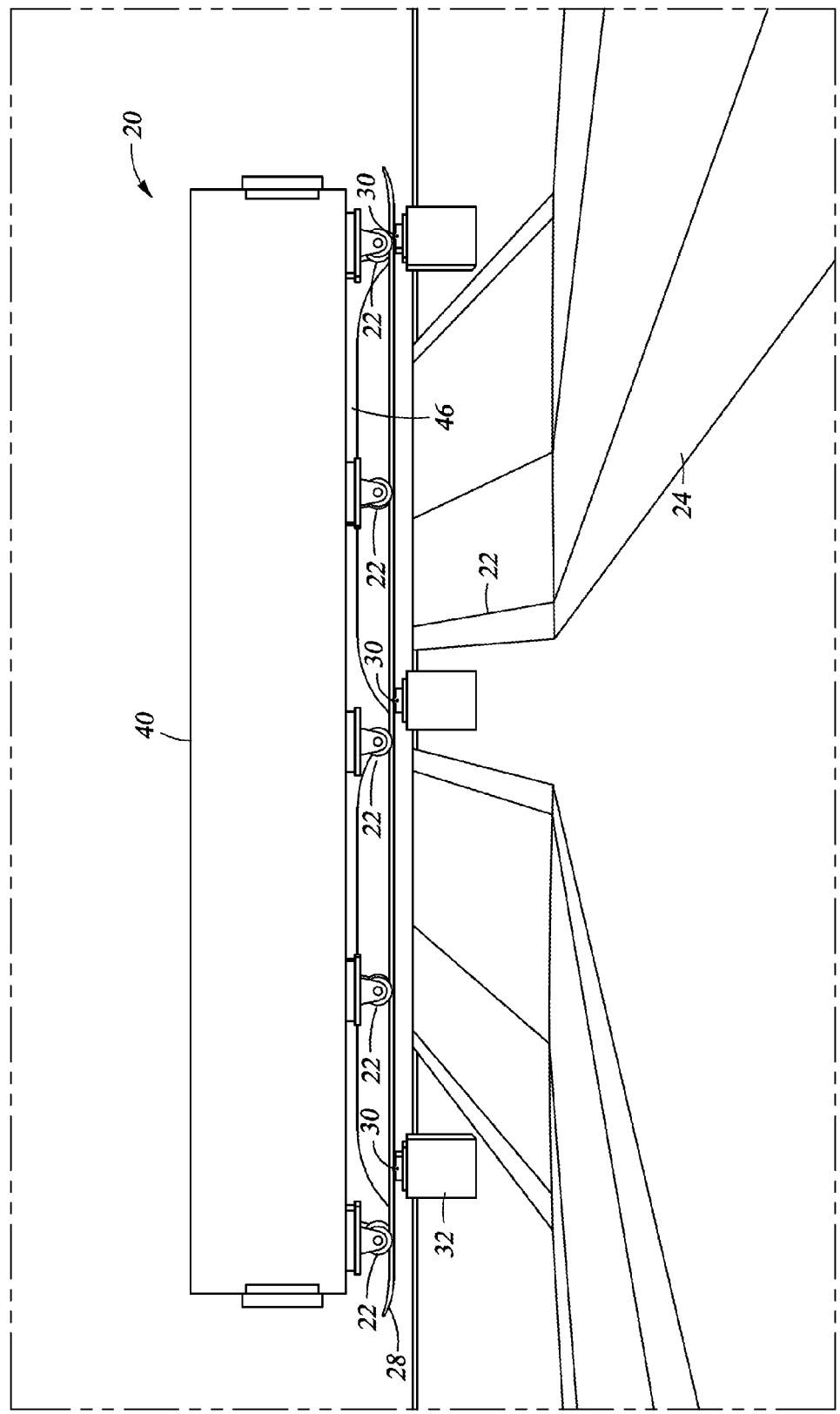
FIG. 3 is a perspective end view of the ferry of FIG. 2.
Figure 4:
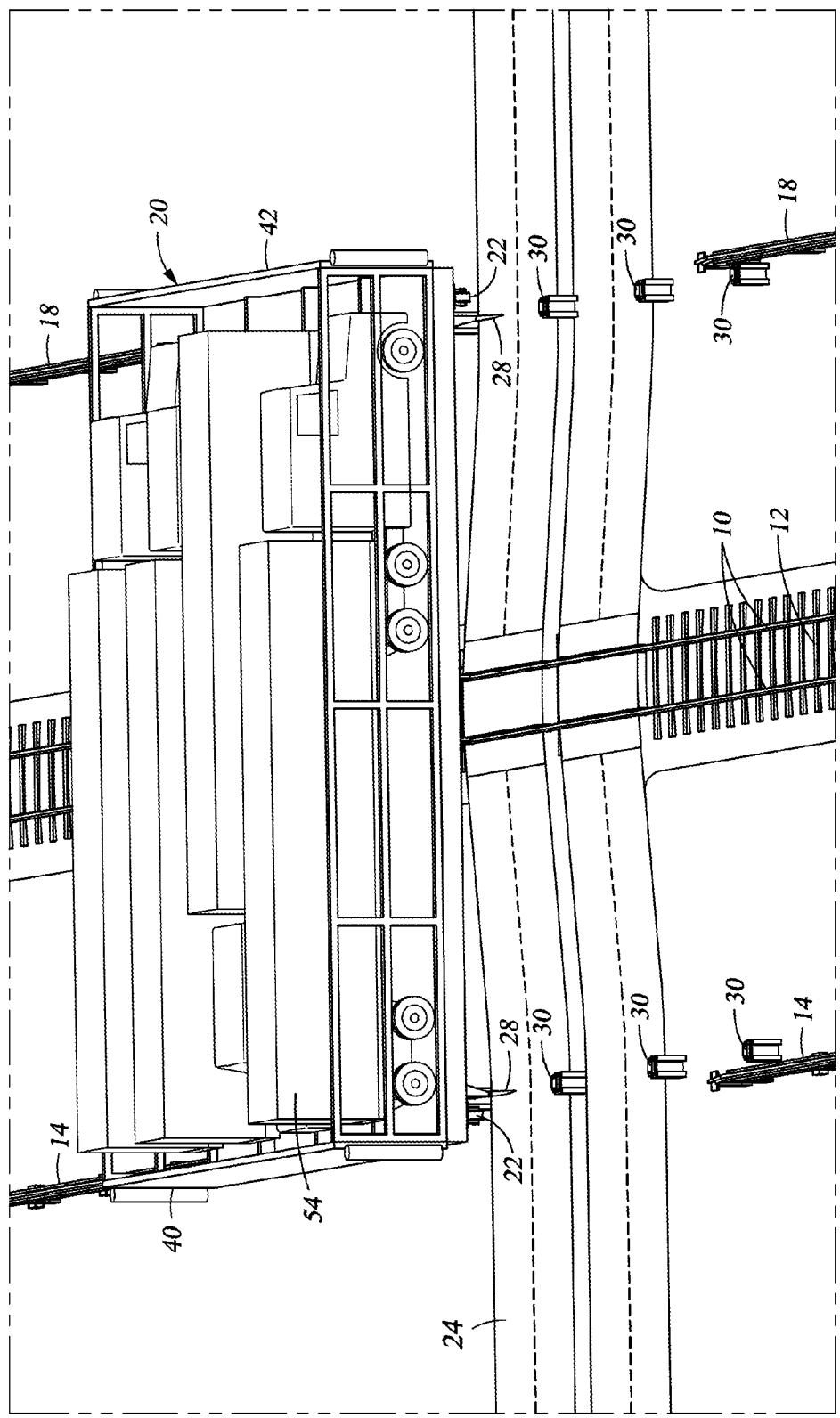
FIG. 4 is a perspective view of the ferry of FIG. 2 with trucks being transported by the ferry.

Referring now to FIGS. 2 and 3, a truck rail car or truck ferry 20 includes a body 44 having longitudinal beams 46 and cross members 48 supporting a truck bed 50. The truck bed 50 may have dividers 52 for the trucks 54, shown in FIG. 4. Truck ferry 20 has side walls or gates 40, 42 which are movable, such as by hydraulic actuation, and also serve as ramps to allow trucks to drive on and off truck ferry 20. The truck ferry 20 also includes conventional rail trucks or bogies 56 that engage the tracks 11. The bogies 56 have axles and flanged wheels for maintaining the truck ferry 20 on rails 10. Conventional air suspension systems are also provided on truck ferry 20 to provide air suspension for the bogies 56.

In maintaining the truck ferry 20 level, side rails 14, 18 restrict the ability of the truck ferry 20 to tilt to one side and only allow a side tilt to a prescribed tolerance. These outrigger rails 14, 18 carry a minimum of the total weight and are maintained at a constant distance from the center line 15 of the original (inboard) rails 10. Rollers 22 are mounted on an axle 58 disposed on a yoke 60 on a plate 62 attached to the body 64 of the truck ferry 20. The rollers 22 on truck ferry 20, shown in FIGS. 3 and 5, are mounted on the underside of the truck ferry 20 so as to rest on these side rails 14, 18.

Since in an embodiment existing railroad lines are used, means are provided to allow the truck ferry 30 to cross existing roads 24. As shown in FIG. 1, a plurality of supports 32 are set in the ground 17 and spaced across the existing road 24. Supports 32a and 32b are disposed on each side of the road 24 and support 32c is disposed in the median of the road 24. There are also additional supports 32d as needed on the outside of supports 32a and 32b. The supports 32 extend on each side of the rails 10 a predetermined distance inside the continuous elevated rails 14, 18. Wheels 30, shown in FIGS. 1, 2 and 5, are mounted on yokes 27 on plates 26 disposed on supports 32 so as to engage fixed rails 28 on the truck ferry 20.

Figure 5:
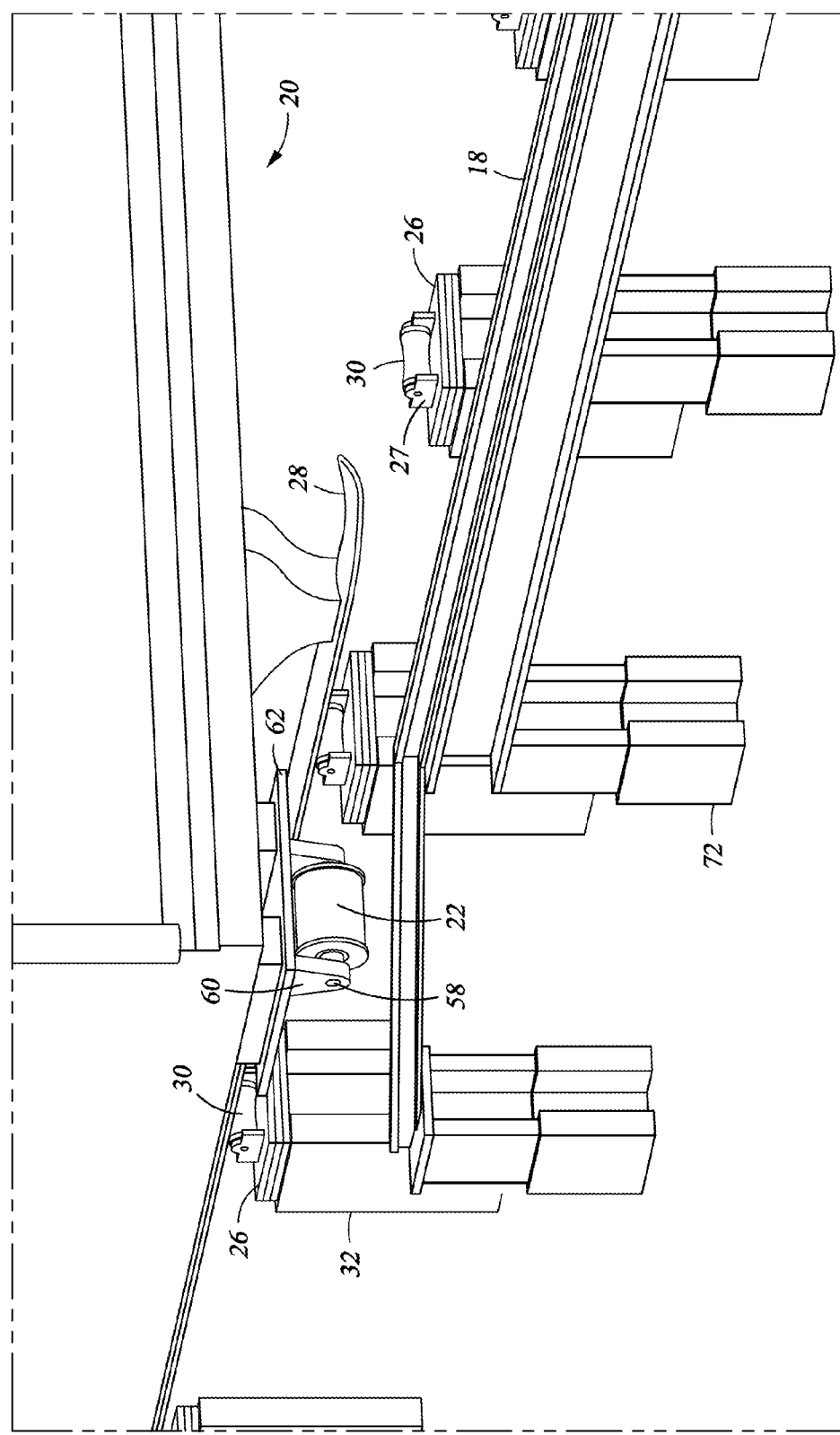
FIG. 5 is a perspective view of the ferry of FIG. 2 showing ferry rollers engaging the side rails and the ferry rails engaging the wheels.

Fixed rails 28, shown in FIG. 5, are mounted on each underside of the truck ferry 20. There are preferably two fixed rails 28. These mounted rails 28 extend out in front of the truck ferry 20 and also extend out in the rear as far as possible without impacting operations of the train as a whole. These form cantilevered portions that engage the next set of oncoming wheels 30.

As shown in FIG. 2, the continuous elevated rails 14, 18 end at existing roadways 24. The initial supports 32d are spaced interiorly of the rails 14, 18 and overlap with the ends of the rails 14, 18 such that the outrigger rails 28 engage the wheels 30 on the initial supports 32d before the rollers 22 disengage the rails 14, 18. The outboard rails 14, 18 of truck ferry 20 are used to balance the truck ferry 20 as the truck ferry 20 and train approach an existing road 24, such as shown in FIG. 1, and then the rails 28 engage wheels 30 to allow the ferry 20 to maintain its balance as it crosses the existing road 24, all without (permanent) closure or alteration of the existing road 24. Thus wheels 30 mounted on the ground 17 are matched to the rails 28 to allow the 20 truck ferry to cross existing highways and roads without permanent impediment to the highways.

There exists a geometric relationship between the spacing of the ground wheels 30 and the length of the outrigger rails 28. At a minimum, in order to ensure that the rail 28 always rests on a minimum of two wheels 30, the maximum spacing between wheels 30 needs to be less than one half the effective length of the rail 28. For example, a 65' rail 28 requires a wheel spacing of no more than 32 feet. Spacing may be less than this but should never exceed it in order to maintain a minimum of two wheels 30 acting in support and balancing.

These rails 28 and wheels 30 will also perform the balance function in other situations where it is not practical to have continuous elevated rails 14, 18 extend over an obstacle that will not accommodate side rails 14, 18.

The center of the now widened truck ferry 20 rests on traditional rail bogies (trucks) 56. However, rather than a traditional eight to ten foot width, the truck ferry 20 is widened to a width of eighty feet or so. This is to accommodate the length of a tractor trailer unit 54, best shown in FIG. 4. At this width, balance becomes important. Finally the truck ferry 20 includes an air ride suspension on the main bogies 56 to adjust height and weight distribution. A moveable counterweight 66, such as a block of steel or concrete block, moveable away or towards the centerline of the truck ferry 20 may be used to ensure a balanced load. The trucks themselves are located on the car bed 50 to achieve balance while the counterweight 66 is for fine tuning the balance.

The locomotives and track itself are specified for necessary horsepower, weight and speed. The truck ferry 20 is a platform 60 feet by 80 feet and is thus wider than it is long. It is equipped with the outrigger suspension on the underside of the platform 56 on each side that rides on parallel tracks 14, 18 in a plane with the main tracks 10. Approximately ten percent of the weight ferry 20 is carried on each outrigger track 28 with eighty percent carried on the main track 10. This weight is adjusted by the use of the air ride suspension on the bogies 56 riding on the main track 10. Balance is achieved in loading by pre-weighing the trucks upon arrival, adjustment of the truck's/trailer's tandem axles on trucks 54 by the driver and loading the trucks in opposing directions. Additionally the adjustable counterweight 66 is used for final balancing. On board pressure indicators confirm proper weight distribution and are double-checked with a device as simple as a plum line.

The apparatus and method for the truck ferry transports fully loaded and/or empty tractor trailers thereby offering many advantages.

Truckers achieve lower operating costs and higher utilization rates. Railroads operating the transports generate new revenue and justify upgraded tracks. State highway departments save on repair of rural highways. Air emissions are reduced and highway safety is advanced. One single 500 mile run with a fully loaded train represents a net fuel savings of 23,000 gallons.

Further the system offers the trucking industry the ability to keep a truck moving at 50 mph without a driver having to log driving or on duty time and without burning any fuel. When a truck sits in a truck stop with the driver sleeping for ten hours, several things are happening. The truck engine is probably idling to keep either warm or cool depending on the weather. (According to the EPA, this burns some 2500 gallons of diesel a year and can cut engine life in half) The load is not moving and in the case of perishables, may be deteriorating in value. The clock is ticking on the payback time for the original investment in the vehicle. Anybody or company that operates heavy trucks on a non-local basis will benefit from the system. This number is in the millions. For instance; Interstate 35 between Dallas and San Antonio will see 10,000 rigs per day and the number is expected to rise by 35% by 2017.

The apparatus and method transports tractor-trailers on modified rail flat cars (3 to 4 trucks per rail car). The drive on/drive off system allows a driver to pull into the railhead yard and then directly onto the transport 20. The truck alignment is perpendicular to that of the train. This allows a total of approximately 300 rigs to be loaded on the train. The total weight is comparable to a conventional coal train as is the number of locomotives required and the overall length. The driver gripes the truck down to the rail car with chains, assisted/directed by the loading crew. This continues until the train is fully loaded and then pulls out on a set schedule. The driver is now free to sleep in the cab, allowing him to log this time as "sleeper time" We now have a situation whereby the driver is legally not accumulating hours and the truck is moving at an average speed of 50 mph.

Continuous 500 mile segments of existing or new railroad right of ways are constructed in order to transport trucks to and from outlying areas of major cities such as an area just east of El Paso, Tex., to an area south of the Dallas/Fort Worth metroplex. This is not to be confused with current piggy back systems used simply to transport trailers and containers. The system will move the entire tractor-trailer and the driver for a price lower than they can drive it themselves.

A nation wide system of 20 to 25 segments is envisioned consisting of approximately 500-mile links with loading and unloading docks at each end and one at midpoint. Both railheads and the midpoint will be located in rural areas near major highways leading to urban areas or transportation choke points.

There exists an absolutely untapped market worth several billion dollars a year in revenues by providing drive/on drive/off, fast rail service to the nations long and regional haul, heavy truck fleet. Not only could the servicing of this market produce revenues of this magnitude, it will also conserve millions of barrels of oil, reduce in a major way highway construction costs and impact public safety on our nations highways.

Legal uses may arise in using the transport. One key area of rail law is that even a very small shortline rail company, if fully licensed, has power of eminent domain if a public good can be demonstrated.

The areas in the vicinity of the railheads and the midpoint will naturally increase in value do to their proximity to this improved form of transportation. They would become magnets for development, especially for warehousing and distribution. Current trends relating to container movement bear this out as demonstrated by the Dallas Hub development southeast of Dallas. Additionally these areas would attract interest from manufactures of truly oversized equipment and agricultural interests and processors.

In terms of actual end users of this land ferry type of service the number would be two to three million in the trucking industry alone. In addition a significant number in the agricultural area may take advantage of an ability to more easily transport their products to competing elevators. Manufacturers of mobile homes would be able to extend their market areas. In the event of a natural disaster, such as hurricane, emergency housing could be mobilized from a far greater area. There are advantages in this system that could be utilized by the Defense Department. Already mentioned are the manufacturers of oversized equipment currently hampered by width restrictions on highways.

The market as far as franchise type sales is somewhat limited. There are seven or eight majors in the railroad industry although the number seems destined to shrink again. The second tier contains some six to seven hundred companies ranging from some fairly significant systems to some mom and pop, one locomotive short lines. Although varying greatly in size, they all share the same legal advantages by being operating systems.

U.S. Provisional Application Ser. No. 60/895,499, filed Mar. 19, 2007 entitled Drive On/Drive Off Land Ferry For Large Trucks is hereby incorporated herein by reference.

While a preferred embodiment of the invention has been shown and described, modifications thereof can be made by one skilled in the art without departing from the spirit of the invention.

The invention claimed is:

1. A transport system for transporting trucks over a railroad track, comprising:
   a body adapted to support the trucks;
   the body having a plurality of first rollers adapted to engage the railroad track, a plurality of second rollers, and at least a parallel set of body rails;
   a pair of side rails on the ground spaced from the railroad track and adapted for engagement with the plurality of second rollers; and
   a parallel set of supports on the ground, each support having a wheel adapted for engagement with one of the body rails on the body.

2. The transport system of claim 1 wherein the body includes gates allowing the trucks to drive onto the body.

3. The transport system of claim 1 wherein the side rails are supported by a plurality of mounts extending from the ground.

4. The transport system of claim 3 wherein the side rails end at an existing road.

5. The transport system of claim 1 wherein the side rails end at an existing road and the supports are spaced a predetermined distance from one end of a first pair of side rails and across an existing road to a second pair of side rails.

6. The transport system of claim 1 wherein the wheel is mounted on a yoke disposed on top of the support.

7. The transport system of claim 1 wherein the wheels and side rails include a geometric surface to maintain alignment.

8. The transport system of claim 7 wherein the geometric surface is a conforming arcuate surface.

9. The transport system of claim 1 wherein the body rails include cantilever portions extending past the ends of the body.

10. The transport system of claim 9 wherein the cantilever portions have a length that prevents the deflection/tipping of the body prior to engaging the next adjacent rollers.

11. A truck transport system for travel on a railroad having railroad tracks, comprising:
    a rail car having rail car bogies adapted to roll on existing railroad tracks;
    the rail car including a plurality of rollers outside the rail car bogies along each longitudinal side of the rail car and adapted for engaging side rails extending parallel to and spaced from the railroad track; and
    parallel rails attached to the rail car and extending along the longitudinal sides of the rail car and adapted for engagement with wheels on supports spaced predetermined distances across existing roadways and spaced from the railroad tracks.

12. A method for transporting a plurality of trucks on a railroad, the method comprising:
    rotatably disposing a rail car on existing railroad tracks;
    driving said trucks onto the rail car;
    supporting longitudinal sides of the rail car on a second set of rails on the ground spaced from and parallel to the existing railroad tracks, the second set of rails engaging a second set of rollers on the rail car; and
    supporting the longitudinal sides of the rail car across existing roadways by rails on the rail car engaging wheels which are on supports that are on the ground.

13. The method of claim 12 wherein the longitudinal sides of the railroad car are supported by outrigger rails.

* * * * *